US012116948B2

(12) United States Patent
Drouyer et al.

(10) Patent No.: US 12,116,948 B2
(45) Date of Patent: Oct. 15, 2024

(54) ESTIMATING A LEVEL OF CORROSION OF AN INJECTOR

(71) Applicant: VITESCO TECHNOLOGIES GMBH, Regensburg (DE)

(72) Inventors: Morgan Drouyer, Toulouse (FR); Quentin Dussardier, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 3 days.

(21) Appl. No.: 18/011,805

(22) PCT Filed: Jun. 30, 2021

(86) PCT No.: PCT/EP2021/067940
§ 371 (c)(1),
(2) Date: Dec. 20, 2022

(87) PCT Pub. No.: WO2022/012929
PCT Pub. Date: Jan. 20, 2022

(65) Prior Publication Data
US 2023/0250775 A1    Aug. 10, 2023

(30) Foreign Application Priority Data

Jul. 16, 2020   (FR) ..................................... 2007439

(51) Int. Cl.
*F02D 41/22*   (2006.01)
*F02M 65/00*   (2006.01)
*G01M 15/04*   (2006.01)

(52) U.S. Cl.
CPC ............ *F02D 41/22* (2013.01); *F02M 65/00* (2013.01); *G01M 15/042* (2013.01); *F02D 2041/224* (2013.01)

(58) Field of Classification Search
CPC ...... F02D 41/008; F02D 41/042; F02D 41/22; F02D 41/221; F02D 41/24;
(Continued)

(56) References Cited

U.S. PATENT DOCUMENTS 10,378,474 B2    8/2019  Hirchenhein et al.
10,578,043 B2    3/2020  Hirchenhein et al.
(Continued)

FOREIGN PATENT DOCUMENTS

DE    10 2015 205 877    10/2016
EP         3 572 657    11/2019
(Continued)

OTHER PUBLICATIONS

International Search Report for PCT/EP2021/067940 dated Sep. 17, 2021, 5 pages.
(Continued)

*Primary Examiner* — Logan M Kraft
*Assistant Examiner* — Johnny H Hoang
(74) *Attorney, Agent, or Firm* — NIXON & VANDERHYE

(57) ABSTRACT

Disclosed is a method for estimating a level of corrosion of an injector of an engine, the engine including a reference injector and at least one other injector, each injector including a tip in fluidic communication with a combustion chamber specific to each of the injectors, the respective combustion chamber of each injector also being in fluidic communication with an exhaust system of the engine. The method includes: while the engine is stopped, inhibiting a propagation of the gases from the exhaust system toward the tip of the reference injector; determining a static flow rate of an injector and a static flow rate of the reference injector; and estimating a level of corrosion of the injector by
(Continued)

comparing the static flow rate of the injector with the static flow rate of the reference injector.

13 Claims, 2 Drawing Sheets

(58) Field of Classification Search
CPC .......... F02D 41/2467; F02D 2041/389; F02D 2041/224; F02D 2200/0614; F02M 65/00; F02M 65/001; F02M 2200/05; G01M 15/04; G01M 15/042; Y02T 10/40; G01F 9/00
See application file for complete search history.

(56) References Cited

U.S. PATENT DOCUMENTS

| | | |
|---|---|---|
| 11,384,705 B2 | 7/2022 | Dussardier |
| 2014/0060492 A1* | 3/2014 | Woolvett ................ F02D 19/06 123/478 |
| 2015/0300286 A1 | 10/2015 | Ikemoto |
| 2019/0360417 A1 | 11/2019 | Hesketh et al. |
| 2022/0018304 A1 | 1/2022 | Gambier et al. |

FOREIGN PATENT DOCUMENTS

| | | |
|---|---|---|
| FR | 3 083 268 | 1/2020 |
| FR | 3 089 565 | 6/2020 |
| FR | 3 094 417 A1 | 10/2020 |
| WO | 2016/155986 | 10/2016 |
| WO | 2017/021091 | 2/2017 |

OTHER PUBLICATIONS

Written Opinion of the ISA for PCT/EP2021/067940 dated Sep. 17, 2021, 6 pages.

Wintrich et al., "Diesel Injection System with Closed-loop Control", Development Engine Management, 2018, pp. 54-58 (6 total pages).

* cited by examiner

[Fig. 1]
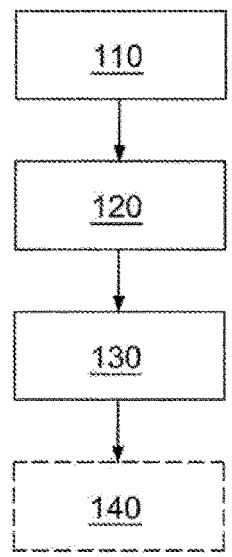
[Fig. 2]
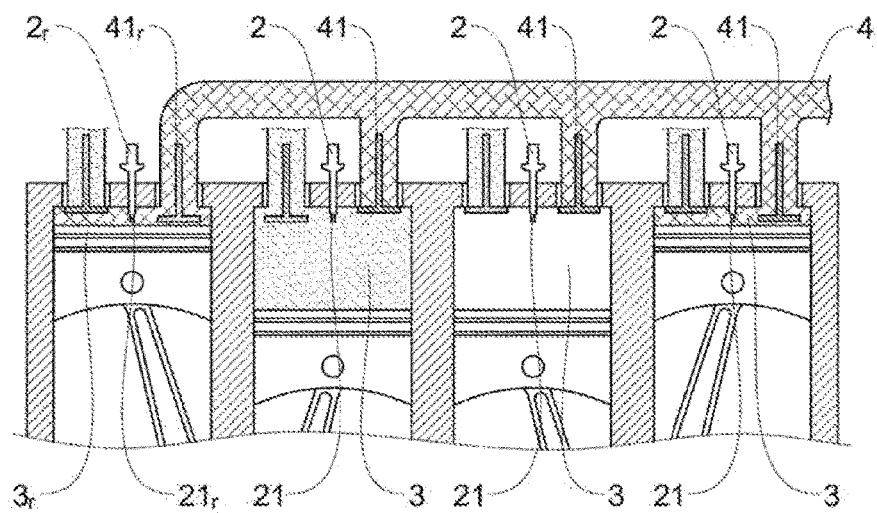

[Fig. 3]
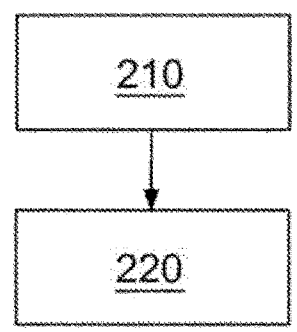

ESTIMATING A LEVEL OF CORROSION OF AN INJECTOR

CROSS-REFERENCE TO RELATED APPLICATION(S)

This application is the U.S. national phase of International Application No. PCT/EP2021/067940 filed Jun. 30, 2021 which designated the U.S. and claims priority to FR 2007439 filed Jul. 16, 2020, the entire contents of each of which are hereby incorporated by reference.

BACKGROUND OF THE INVENTION

Field of the Invention

The present invention relates to a method for estimating a level of corrosion of an injector of an injection engine. The invention applies more particularly to the automotive industry.

Description of the Related Art

Traditionally, an injection engine comprises injectors provided with injection orifices and a rail for supplying the injectors with fuel. These injectors are suitable for injecting fuel into cylinders through said orifices, the fuel being subjected to a determined pressure in the rail by means of a high-pressure pump.

The injectors, because of their use, are subject to phenomena of corrosion and clogging. The present application is concerned in particular with the phenomenon of corrosion.

The corrosion of an injector, causing the enlargement of the orifices of the injector, sometimes leads to an increase in the static flow rate of the injector and therefore a modification of the quantity injected by the injector.

In addition, the corrosion attacks the various orifices of the injector unevenly, which affects the atomization of the fuel in the cylinder and leads to an increase in pollutant emissions, even if the quantity injected has only varied very slightly.

Indeed, it is possible that the injector is both clogged and corroded. Since these phenomena compensate each other, it is therefore not possible to determine a level of corrosion or clogging of the injector by simply referring to the injected quantity of the injector or to its static flow rate by the use of known methods.

In particular, no method is known that makes it possible to estimate a level of corrosion of an injector, whatever its type, whether it is a solenoid injector or a piezoelectric injector.

SUMMARY OF THE INVENTION

A first objective of the present application is therefore to propose a method for estimating a level of corrosion of an injector in an engine.

A second objective is to estimate this level of corrosion without adding additional sensors which significantly increase the complexity of the system.

A third objective is to trigger an alert when the corrosion level of an injector is too high.

A fourth objective is to distribute a corrosion level of a plurality of injectors uniformly between the injectors.

In this respect, the present application describes a method for estimating a level of corrosion of an injector of an engine, the engine comprising a reference injector and at least one other injector, each injector comprising a tip in fluidic communication with a combustion chamber specific to each of the injectors, the respective combustion chamber of each injector also being in fluidic communication with an exhaust system of the engine, said method being characterized in that it comprises the following steps:
while the engine is stopped, inhibiting a propagation of the gases from the exhaust system toward the tip of the reference injector,
determining a static flow rate of an injector and a static flow rate of the reference injector,
estimating a level of corrosion of the injector by comparing the static flow rate of said injector with the static flow rate of the reference injector.

According to an alternative, the step of inhibiting the propagation of the gases comprises closing each exhaust valve corresponding to the reference injector.

According to an alternative, when the level of corrosion of the injector is greater than a determined threshold, the method comprises an additional step of generating an alert.

According to an alternative, the engine comprises a plurality of injectors and the steps of determining a static flow rate of an injector and of estimating the level of corrosion of said injector are implemented for each injector of the plurality of injectors of the engine.

The estimation method presented above advantageously makes it possible to estimate the level of corrosion of one or a plurality of injectors of an engine in a precise manner by the use of a noncorroded reference injector. This estimation is independent of the variations in the quality and/or temperature of the fuel since the reference injector is subject to the same operating conditions as the other injectors. Furthermore, the method does not require additional sensors and therefore makes it possible to obtain a level of corrosion of the injectors without further complicating the injection system.

The present application also describes a method for distributing a level of corrosion between a plurality of injectors of an engine, the engine also comprising a reference injector, each injector comprising a tip in fluidic communication with a combustion chamber specific to each of the injectors, the respective combustion chamber of each injector also being in fluidic communication with an exhaust system of the engine, said method being characterized in that it comprises the following steps:
implementing the method for estimating a level of corrosion when it is carried out on a plurality of injectors, and
stopping the engine such that an exhaust valve corresponding to the injector having the lowest corrosion level estimation among the plurality of injectors is opened.

The method for distributing the level of corrosion thus makes it possible to distribute the corrosion between the various injectors of the engine without adding additional sensors, which therefore makes it possible to extend the life of the injection system without making it more complex.

The present application is also aimed at a computer program product, comprising code instructions allowing the implementation of the steps of a method described above.

The present application also introduces a computer suitable for controlling an engine, the engine comprising a reference injector and at least one other injector, each injector comprising a tip in fluidic communication with a combustion chamber specific to each of the injectors, the respective combustion chamber of each injector also being in fluidic communication with an exhaust system of the engine, the computer being characterized in that it is suitable for the implementation of the following steps:

while the engine is stopped, inhibiting a propagation of the gases from the exhaust system toward the tip of the reference injector, determining a static flow rate of an injector and of the reference injector, estimating a level of corrosion of the injector by comparing the static flow rate of said injector with the static flow rate of the reference injector.

According to an alternative, the engine comprises a plurality of injectors and the computer is suitable for implementing the steps of determining a static flow rate of an injector and of estimating the level of corrosion for each injector of the plurality of injectors of the engine.

In this alternative, the computer can also be suitable for controlling an engine stop such that an exhaust valve associated with the injector having the lowest corrosion level estimation among the plurality of injectors is opened.

Finally, the present application discloses an engine comprising a reference injector and at least one other injector, each injector comprising a tip in fluidic communication with a combustion chamber specific to each of the injectors, the respective combustion chamber of each injector also being in fluidic communication with an exhaust system of the engine, the engine also comprising a computer as presented according to one of the above alternatives.

BRIEF DESCRIPTION OF THE DRAWINGS

Other features, details and advantages will become apparent on reading the following detailed description and on analyzing the appended drawings, in which:

FIG. 1 presents a flowchart of an embodiment of a method for estimating a level of corrosion of an injector.

FIG. 2 presents an embodiment of an engine in which the method for estimating a level of corrosion is implemented.

FIG. 3 represents a flowchart of an embodiment of a method for distributing a level of corrosion between a plurality of injectors.

DESCRIPTION OF THE EMBODIMENTS

Reference is now made to [FIG. 2] presenting an embodiment of an engine allowing the implementation of a method for estimating a level of corrosion of an injector represented in [FIG. 1]. In this case, the engine is not represented in its entirety in [FIG. 2].

Advantageously, the engine can be on board a motor vehicle such as a car or a truck, for example.

In this case, the engine comprises a reference injector $2_r$ and at least one other injector 2. Advantageously, the engine comprises the reference injector $2_r$ and a plurality of injectors 2 as shown in [FIG. 2]. The injectors $(2, 2_r)$ are in fluidic communication with a high-pressure fuel supply rail which for its part is not shown in [FIG. 2].

Each injector comprises a tip $(21, 21_r)$ in fluidic communication with a combustion chamber $(3, 3_r)$ specific to each of the injectors. The tip of each injector comprises a plurality of orifices (not shown) so that fuel passing from the supply rail through an injector can be delivered into a combustion chamber through these orifices. It is these orifices which undergo corrosion and which therefore see their diameter widen as the injector is used.

The combustion chamber $(3, 3_r)$ corresponding to each injector $(2, 2_r)$ is in fluidic communication with an exhaust system 4 of the engine. The exhaust system 4 of the engine makes it possible to evacuate the exhaust gases produced by the combustion of the fuel in the combustion chambers.

The engine further comprises at least one exhaust valve $(41, 41_r)$ associated with each combustion chamber $(3, 3_r)$ (and therefore with each injector $(41, 41_r)$) arranged in such a way that, when it is closed, it cuts off the fluidic communication between the combustion chamber and the exhaust system 4 of the engine.

It will be understood here that the tip $(21, 21_r)$ of an injector $(2, 2_r)$ is in fluidic communication with the exhaust system 4 when the exhaust valve associated with its combustion chamber $(3, 3_r)$ is open.

There is now described with reference to [FIG. 1] a method for estimating a level of corrosion of an injector 2 of the engine. It will be a question here of determining the level of corrosion of an injector 2 from a comparison between the injector 2 and the reference injector $2_r$. This method can be implemented by a computer (not shown) having a memory storing the code instructions for implementing the method. Of course, the code instructions can be stored in any other memory accessible to the computer.

In the case where the engine is on board a vehicle, the method can be implemented by a computer on board the vehicle and advantageously by a computer called an engine control unit (ECU).

The method comprises a first step implemented while the engine is stopped. This is a step of inhibiting 110 a propagation of the gases from the exhaust system 4 toward the tip $21_r$ of the reference injector $2_r$.

The inventors noticed that the phenomenon of corrosion of the orifices of the injectors was strongly linked to the corrosive gases present in the exhaust system of the engine after stopping the engine. However, as explained previously, the exhaust system is in fluidic communication with the tip of the injectors by means of the exhaust valves.

This step of inhibiting 110 the propagation of the gases from the exhaust system 4 toward the tip $21_r$ of the reference injector $2_r$ thus makes it possible to preserve the orifices of the reference injector $2_r$ from corrosion. In this way, with the reference injector $2_r$ being subject to the same operating conditions as the other injectors 2 of the engine except as regards the phenomenon of corrosion, it can be compared with the other injectors 2 of the engine in order to determine their respective level of corrosion. In other words, the reference injector $2_r$ is used to isolate the corrosion characteristic present on the other injectors.

The inhibition 110 can for example be implemented by closing each exhaust valve $41_r$ corresponding to the reference injector $2_r$. In this case, a person skilled in the art knowing the engine model is capable of implementing this step. As explained previously, the closing of the exhaust valves associated with the combustion chamber of an injector makes it possible to cut the fluidic communication between the combustion chamber of the injector, and therefore also the tip of the injector located in this chamber, and the exhaust system of the engine.

A second step of the method comprises a determination 120 of a static flow rate of an injector 2 and of a static flow rate of the reference injector $2_r$. By static flow rate of an injector is understood here a flow rate of fuel delivered at a determined fuel pressure by the injector into its combustion chamber when it is open to the maximum.

Numerous methods known to a person skilled in the art make it possible to estimate the static flow rate of an injector.

For example, there are methods based on measuring the vacuum observed in the fuel supply rail during injection, or methods based on analyzing the signal from the crankshaft sensor or the signal from the richness sensor. There are still other methods using sensors, for example a sensor via electrical contact between the needle and the tip of the injector or else a cylinder pressure sensor in the combustion chamber. All the methods for estimating the static flow rate of an injector can be used here.

As explained previously, with the corrosion of an injector inducing an increase in the diameter of the orifices of the injector, the static flow rate of the injector is thereby increased since, for a given supply pressure, more fuel can pass through the orifices of this injector.

To this extent, the static flow rate of the injector 2 undergoing corrosion diverges, as the injector 2 is used, with respect to the static flow rate of the reference injector $2_r$ which for its part is not subject to the phenomenon of corrosion thanks to the inhibition step 110.

Advantageously, the method used to determine the static flow rate of the injector 2 and the static flow rate of the reference injector $2_r$ is the same.

Thus, a third step of the method comprises an estimation 130 of a level of corrosion of the injector 2 by comparison of the static flow rate of said injector 2 with respect to the static flow rate of the reference injector $2_r$. As explained above, the static flow rate of the injector 2 diverges with respect to the static flow rate of the reference injector $2_r$ since the latter is not subject to the phenomenon of corrosion. With the two injectors ($2, 2_r$) being subject to the same operating conditions except with regard to the corrosion characteristic, the comparison of their respective static flow rate thus makes it possible to obtain the level of corrosion of the injector 2 compared by methods known to a person skilled in the art. Furthermore, since the two injectors ($2, 2_r$) are subject to the same operating conditions, the method overcomes, among other things, all problems related to the quality and/or the temperature of the fuel to estimate the level of corrosion of the injector 2.

For example, a corrosion level can be obtained from a correspondence table associating a corrosion level with a difference between the static flow rate of a noncorroded injector and that of a corroded injector for a given injector model.

In the embodiment comprising a plurality of injectors 2, it will be understood that it is also possible to estimate the respective level of corrosion of each injector by comparing its static flow rate with that of the reference injector $2_r$.

It will also be understood that using the same method of estimating the static flow rate for the injector 2 and for the reference injector $2_r$ makes it possible to obtain a more precise level of corrosion of the injector 2.

Furthermore, the method may comprise an additional step of generating 140 an alert when the estimated level of corrosion of the injector 2 is greater than a determined threshold. The alert can for example consist in warning the driver, when the engine is on board a vehicle, that he must change the injector 2 whose level of corrosion is greater than the aforementioned threshold.

It will therefore be understood that the method presented above makes it possible to estimate the level of corrosion of one or a plurality of injectors of an engine in a precise manner. This precise estimation can be made by comparing an injector 2 and the noncorroded reference injector $2_r$. With the latter being subject to the same operating conditions as the other injectors 2, the estimation of the level of corrosion proposed is independent of the variations in the quality and/or temperature of the fuel. Moreover, the estimation of the level of corrosion according to the invention can be implemented in an existing system, thus avoiding the addition of additional sensors and therefore additional complexity and costs for the system.

The invention also presents a method making it possible to distribute a level of corrosion between a plurality of injectors 2 in an engine as presented above. This method is described with reference to [FIG. 3] and is implemented by a computer.

In this case, the method for distributing a level of corrosion between a plurality of injectors 2 of the engine comprises a first step of implementing 210 the method for estimating a level of corrosion described above when this method is executed on the plurality of injectors 2.

Thus, the method for distributing the level of corrosion between the injectors 2 is advantageously implemented by the same computer as that implementing the method for estimating the level of corrosion to avoid a transfer of data from the estimations of the levels of corrosion of the injectors 2.

At the end of this step, the computer is therefore in possession of the corrosion levels of each injector 2 of the plurality of injectors 2.

The method then comprises a second step of stopping 220 the engine so that each exhaust valve 41 of the injector 2 presenting the lowest corrosion level estimation 130 among the plurality of injectors 2 is opened.

As explained previously, the corrosion is caused by a stagnation of the exhaust gases at the tip of the injector 2 after stopping the engine. Preventing the presence of exhaust gases at the tip of an injector therefore makes it possible to protect this injector from corrosion. Consequently, conversely, selecting the least corroded injector of the plurality of injectors 2 and putting its tip in the presence of exhaust gases by opening the corresponding exhaust valves therefore makes it possible to target the corrosion on the least corroded injector 2. However, in view of the traditional operation of an engine, when the exhaust valves 41 corresponding to this injector 2 (and more precisely the exhaust valves 41 of the combustion chamber 3 in which the tip of the injector 2 diffuses fuel) are open, the exhaust valves ($41, 41_r$) associated with the other injectors ($2, 2_r$) are closed and are therefore protected from corrosion when the engine is stopped. One is therefore capable of choosing which injector will be corroded by the exhaust gases following the engine stoppage 220 while preserving the others.

In the same way as above, a person skilled in the art, knowing the engine model, is capable of implementing this step so that when a user requests an engine stoppage, this engine, before stopping, is still turning enough to allow the exhaust valve(s) 41 of the combustion chamber 3 associated with the targeted injector 2 to open.

The method therefore makes it possible to distribute the level of corrosion between the plurality of injectors 2 of an engine from the estimation method presented above and from an engine control step without adding additional elements and therefore without increasing the manufacturing and integration costs of said engine. This makes it possible to extend the life of the injection system without making it more complex by distributing the negative impact of corrosion over all the injectors in a uniform manner.

The invention claimed is:

1. A method for estimating a level of corrosion of at least one secondary injector of an engine including a primary injector and the at least one secondary injector, each of the primary injector and the at least one secondary injector including a tip in fluidic communication with a combustion chamber specific to each of the injectors, the respective combustion chamber of each of the injectors being in fluidic communication with an exhaust system of the engine, said method comprising:

while the engine is stopped, inhibiting a propagation of gases from the exhaust system toward the tip of the primary injector by closing an exhaust valve of the primary injector;

determining a static flow rate of the at least one secondary injector and a static flow rate of the primary injector; and estimating a level of corrosion of the at least one secondary injector by comparing the static flow rate of said at least one secondary injector with the static flow rate of the primary injector.

2. The method for estimating the level of corrosion as claimed in claim 1, wherein, when the level of corrosion of the injector is greater than a determined threshold, the method further comprises generating an alert.

3. The method for estimating the level of corrosion as claimed in claim 2, wherein the engine comprises a plurality of injectors including the primary injector and the at least one secondary injector, and wherein the determining the static flow rate of the at least one secondary injector and the estimating the level of corrosion of said at least one secondary injector are implemented for each of a plurality of secondary injectors of the plurality of injectors of the engine.

4. A non-volatile computer-readable medium on which is stored a computer program, comprising program code instructions for executing the method as claimed in claim 2 when said computer program is executed on a computer.

5. The method for estimating the level of corrosion as claimed in claim 1, wherein the engine comprises a plurality of injectors including the primary injector and the at least one secondary injector, and wherein the determining the static flow rate of the at least one secondary injector and the estimating the level of corrosion of said at least one secondary injector are implemented for each of a plurality of secondary injectors of the plurality of injectors of the engine.

6. A non-volatile computer-readable medium on which is stored a computer program, comprising program code instructions for executing the method as claimed in claim 5 when said computer program is executed on a computer.

7. A non-volatile computer-readable medium on which is stored a computer program, comprising program code instructions for executing the method as claimed in claim 1 when said computer program is executed on a computer.

8. A method for distributing a level of corrosion between a plurality of injectors of an engine, the plurality of injectors including a primary injector and at least one secondary injector, each of the injectors including a tip in fluidic communication with a combustion chamber specific to each of the injectors, the respective combustion chamber of each of the injectors being in fluidic communication with an exhaust system of the engine, said method comprising:

estimating a level of corrosion by:
while the engine is stopped, inhibiting a propagation of gases from the exhaust system toward the tip of the primary injector by closing an exhaust valve of the primary injector,
determining a static flow rate of the at least one secondary injector and a static flow rate of the primary injector, and
estimating the level of corrosion of the at least one secondary injector by comparing the static flow rate of said at least one secondary injector with the static flow rate of the primary injector, the determining the static flow rate of the at least one secondary injector and the estimating the level of corrosion of said at least one secondary injector are implemented for each of a plurality of secondary injectors of the plurality of injectors of the engine, and stopping the engine such that an exhaust valve corresponding to the at least one secondary injector having the lowest corrosion level estimation among the plurality of injectors is opened.

9. A non-volatile computer-readable medium on which is stored a computer program, comprising program code instructions for executing the method as claimed in claim 8 when said computer program is executed on a computer.

10. A computer controlling an engine including a primary injector and at least one secondary injector, each of the primary injector and the at least one secondary injector including a tip in fluidic communication with a combustion chamber specific to each of the injectors, the respective combustion chamber of each of the injectors being in fluidic communication with an exhaust system of the engine, the computer comprising:

one or more processors configured to:
while the engine is stopped, inhibit a propagation of the gases from the exhaust system toward the tip of the primary injector by closing an exhaust valve of the primary injector,
determine a static flow rate of the at least one secondary injector and of the primary injector, and
estimate a level of corrosion of the at least one secondary injector by comparing the static flow rate of said at least one secondary injector with the static flow rate of the primary injector.

11. The computer as claimed in claim 10, wherein the engine comprises a plurality of injectors including the primary injector and the at least one secondary injector, and wherein the one or more processors is configured to determine the static flow rate of the at least one secondary injector and the estimating the level of corrosion for each of a plurality of secondary injectors of the plurality of injectors of the engine.

12. The computer as claimed in claim 11, wherein the one or more processors is configured to control an engine stop such that an exhaust valve associated with the at least one secondary injector having the lowest corrosion level estimation among the plurality of injectors is opened.

13. An engine comprising:
an exhaust system;
a primary injector and at least one secondary injector, each of the primary injector and the at least one secondary injector comprising a tip in fluidic communication with a combustion chamber specific to each of the injectors, the respective combustion chamber of each of the injectors being in fluidic communication with the exhaust system of the engine; a computer configured to control the engine, the computer comprising
one or more processors configured to:
while the engine is stopped, inhibit a propagation of the gases from the exhaust system toward the tip of the primary injector by closing an exhaust valve of the primary injector, determine a static flow rate of the at least one secondary injector and of the primary injector, and
estimate a level of corrosion of the at least one secondary injector by comparing the static flow rate of said at least one secondary injector with the static flow rate of the primary injector.

\* \* \* \* \*